358-86. OR 3,355,546 SR
Nov. 28, 1967 L. H. KING 3,355,546
PAY SOUND SYSTEM FOR CLOSED CIRCUIT TELEVISION IN WHICH THE AUDIO COMPONENT IS CONVEYED VIA CARRIER CURRENT TRANSMISSION
Filed Feb. 27, 1964
T 5003
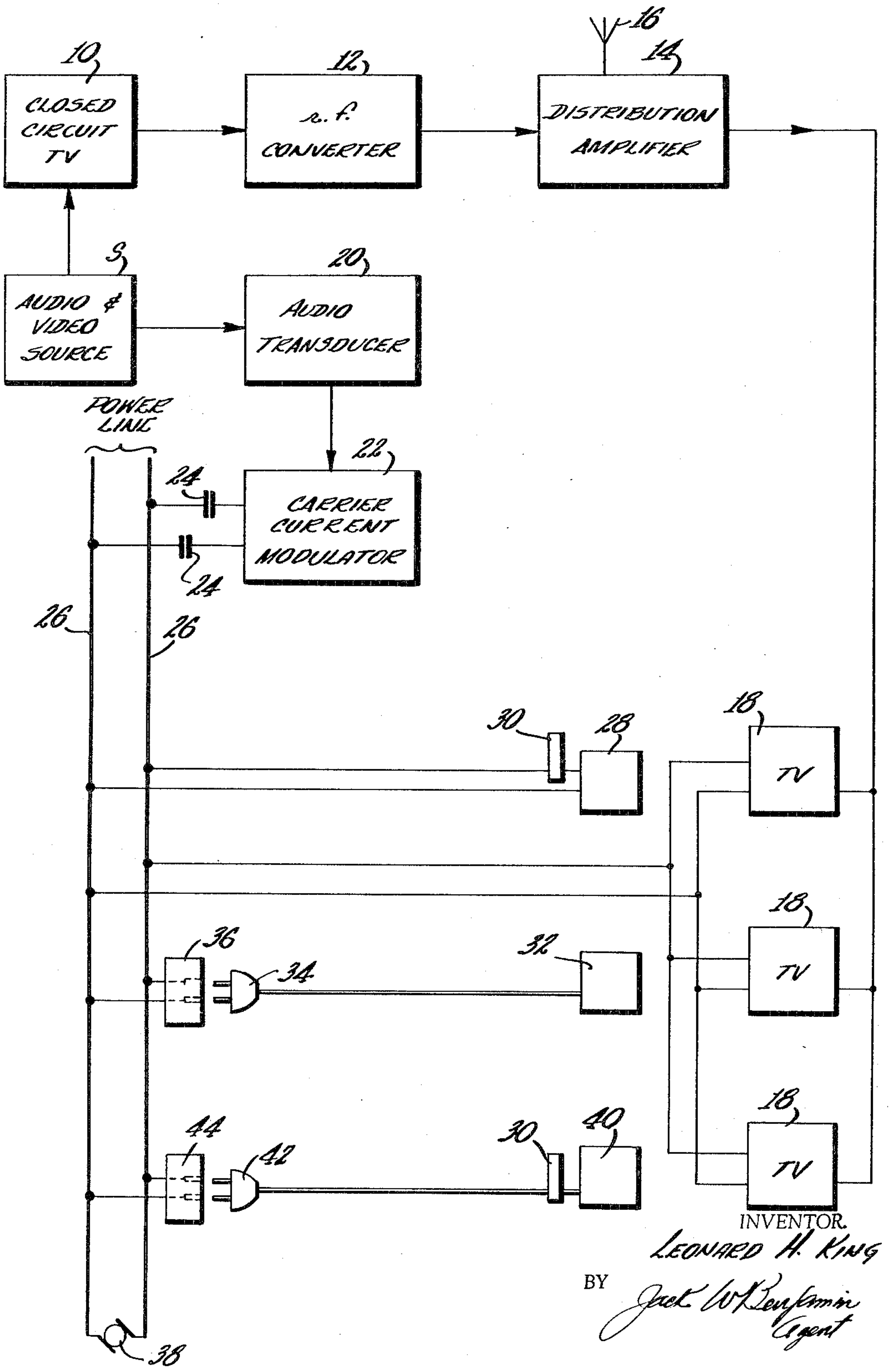
INVENTOR.
LEONARD H. KING
BY Jack W. Benjamin
Agent

1

3,355,546

PAY SOUND SYSTEM FOR CLOSED CIRCUIT TELEVISION IN WHICH THE AUDIO COMPONENT IS CONVEYED VIA CARRIER CURRENT TRANSMISSION

Leonard H. King, 67 Southgate Road, Valley Stream, N.Y. 11581

Filed Feb. 27, 1964, Ser. No. 347,799
2 Claims. (Cl. 178—5.6)

ABSTRACT OF THE DISCLOSURE

This closed circuit television system employs carrier current audio signal distribution over the power lines used to energize the individual receivers.

This invention relates to a pay system for closed circuit television.

Hotels, motels, community television services and other mass networks of television receiver are connected by coaxial cable to central distribution amplifiers to which master antennas supply an input signal. The central distribution amplifiers also provide convenient means to feed closed circuit programs which may be special live programs, motion picture or video tape programs.

The present invention provides a convenient method for charging viewers for the privilege of watching the special program.

Briefly stated, in the system of this invention, the audio portion of the invention is transmitted by carrier current over common power lines. The viewer may listen to the audio portion by means of a conventional carrier current receiver tuned to the transmitted frequency. The receiver may be rented to the user on a time basis or may be provided with a coin controlled power input.

One feature of the invention is that installation is simple. The system employs existing power lines and therefore no additional wiring is required to connect individual units to the system.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the single figure of the drawing there is shown schematically a closed circuit television distribution and display system.

Audio and video for the presentation are provided by source S. The source may be for example, a sound motion picture, live program or video tape. Block 10 represents a typical closed circuit system including a transducer such as a vidicon, flying spot scanner, or magnetic tape playback head, sweep circuits, synchronizing circuits, video amplifiers etc., to provide a video signal which modulates by means of radio frequency converter 12, a radio frequency carrier representing a channel not used in the particular location for conventional telecasting. The output of the converter is fed to distribution amplifier 14 which is thus a common signal distribution means for the network of television receivers 18. It will be noted that master antenna 16 provides means to introduce the normal over-the-air television transmissions into the distribution amplifier so that all the television sets 18 in the system may receive the transmitted programs.

The audio portion of the program is detected by audio transducer 20 such as a magnetic tape reproducer head, microphone, photocell-exciter lamp or equivalent device.

2

The resulting signal is fed to modulator 22 where it is used to modulate a carrier signal of frequency $f_c$, which is coupled by means of blocking capacitors 24 to power line 26. Generator 38 feeds the power lines 26.

A tuned radio frequency or superheterodyne receiver, set to receive frequency $f_c$, is coupled to the same power line proximate to television receiver 18 where the viewer wishes to avail himself of the service. A suitable frequency range is $f_c=100$ kc.

Various types of radio receiver installations are illustrated in the drawings. It will be evident that any particular pay system may utilize any one or any combination of installation methods. In one instance, radio receiver 28 may be permanently secured to the power line and be provided with a coin controlled switch 30. In another instance receiver 32 is removably connected to the power line by means of plug 34 which is inserted into a conventional power outlet 36 to receive the program. In this case the receiver would be rented out for a given period and then removed at the end of the period. Still another alternative is the provision of receiver 40 with both a plug 42, adapted for inserting into a conventional power outlet 44, and coin operated switch 30. It should be noted that the user has the option of first viewing the program before deciding whether or not to subscribe to the audio portion by the insertion of the coin.

There has been disclosed heretofore the best embodiments of the invention presently contemplated and it is to be understood that various changes and modifications may be made by those skilled in the art without departing from the spirit of the invention.

What is claimed is:

1. Apparatus for presenting a combined video and audio source over a closed circuit television system comprising in combination:

(a) a power source;

(b) a plurality of television receivers arranged to be energized from said power source;

(c) a common video and sound distribution means connected to each of said receivers;

(d) video transducer means and video processing means for providing a signal to said common video and sound distribution means responsive to the combined video and audio source;

(e) audio transducing means for detecting the audio portion of the combined video and audio source and to provide an audio signal;

(f) modulator means arranged to receive said audio signal from said audio transducing means for providing for the transmission of a modulated carrier signal with a modulation pattern indicative of the said audio signal;

(g) means for coupling said modulated carrier signal to said power source; and (h) receiver means connected to said power source to receive said modulated carrier signal and to detect the audio signals modulated thereon.

2. The apparatus of claim 1 including a coin-controlled timed switch interposed in the power line energizing said receiver means.

References Cited

UNITED STATES PATENTS 3,093,706 6/1963 Karplus ............ 178—5.6

FOREIGN PATENTS 844,118 8/1960 Great Britain.

JOHN W. CALDWELL, *Acting Primary Examiner.*
DAVID G. REDINBAUGN, *Examiner.*
R. L. RICHARDSON, *Assistant Examiner.*